US 12,521,886 B2

(12) United States Patent
Gaschler et al.

(10) Patent No.: US 12,521,886 B2
(45) Date of Patent: Jan. 13, 2026

(54) STREAMING INPUT BUFFER FOR REAL-TIME ROBOTIC CONTROL

(71) Applicant: Intrinsic Innovation LLC, Mountain View, CA (US)

(72) Inventors: Andre Gaschler, Munich (DE); Benjamin Bremer, Ottobrunn (DE)

(73) Assignee: Intrinsic Innovation LLC, Mountain View, CA (US)

(*) Notice: Subject to any disclaimer, the term of this patent is extended or adjusted under 35 U.S.C. 154(b) by 238 days.

(21) Appl. No.: 17/993,779

(22) Filed: Nov. 23, 2022

(65) Prior Publication Data

US 2024/0165816 A1 May 23, 2024

(51) Int. Cl.
*B25J 9/16* (2006.01)
*B25J 13/00* (2006.01)

(52) U.S. Cl.
CPC ........... *B25J 9/1689* (2013.01); *B25J 13/006* (2013.01)

(58) Field of Classification Search
CPC ................... H04L 67/12; H04L 67/125; H04L 2012/40273; H04L 2012/4028; H04L 69/32; H04L 69/40; H04L 69/321; H04L 69/323; H04L 69/324; H04L 69/329; G06F 9/545; G06F 16/9024; G06F 8/20; G06F 3/0656

See application file for complete search history.

(56) References Cited

U.S. PATENT DOCUMENTS

| | | | |
|---|---|---|---|
| 5,046,022 A * | 9/1991 | Conway | B25J 9/1689 |
| | | | 700/250 |
| 9,069,726 B2 | 6/2015 | Lu | |
| 2018/0229367 A1* | 8/2018 | Lee | G06F 9/544 |
| 2020/0306960 A1* | 10/2020 | Handa | G05D 1/0088 |
| 2023/0300728 A1* | 9/2023 | Kundu | G06F 9/545 |
| 2023/0341868 A1* | 10/2023 | Koehler | A01D 34/008 |
| 2023/0402178 A1* | 12/2023 | Lee | G16H 20/00 |

FOREIGN PATENT DOCUMENTS

WO  WO 2022/103708  5/2022

* cited by examiner

*Primary Examiner* — Dylan M Katz
(74) *Attorney, Agent, or Firm* — Fish & Richardson P.C.

(57) ABSTRACT

Methods, systems, and apparatus, including computer programs encoded on computer storage media, for controlling a robot to perform a custom real-time action. One of the system comprises a non-real-time control layer configured to compute a sequences of control data and to continually write data elements of the sequence of control data into a real-time streaming input buffer; and a real-time control layer configured to continually read data elements of the sequence of control data from the real-time streaming input buffer and to compute a robot control signal from the read data elements of the sequence of control data at every tick of a real-time control loop.

20 Claims, 3 Drawing Sheets

STREAMING INPUT BUFFER FOR REAL-TIME ROBOTIC CONTROL

BACKGROUND

This specification relates to frameworks for software control systems.

Real-time software control systems are software systems that must execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation. Such real-time software control systems are often used to control physical machines that have high precision and timing requirements. As one example, a workcell of industrial robots can be controlled by a real-time software control system that requires each robot to repeatedly receive commands at a certain frequency, e.g., 1, 10, or 100 kHz. If one of the robots does not receive a command during one of the periodic time windows, the robot can enter a fault state by halting its operation or by automatically executing a recovery procedure to return to a maintenance position. In this specification, a workcell is the physical environment in which a robot will operate. Workcells have particular physical properties, e.g., physical dimensions that impose constraints on how robots can move within the workcell.

SUMMARY

This specification describes a real-time robotics control framework that provides a unified platform for achieving multiple new capabilities for custom real-time control. The control framework described in this specification can provide real-time control guarantees over one or more physical robots, i.e., can execute one or more physical robots, including any associated sensors or end effectors, within strict timing requirements to achieve normal operation of the robotic system. In particular, the control framework described in this specification allows for custom real-time handling of streaming inputs. Streaming inputs are real-time inputs that may arrive at varying rates or non-deterministically or both.

In this specification, a framework is a software system that allows a user to provide higher level program definitions while implementing the lower level control functionality of a real-time robotics system. In this specification, the operating environment includes multiple subsystems, each of which can include one or more real-time robots, one or more computing devices having software or hardware modules that support the operation of the robots, or both. The framework provides mechanisms for bridging, communication, or coordination between the multiple systems, including forwarding control parameters from a robot application system, providing sensor measurements to a real-time robotic control system for use in computing the custom action, and receiving hardware control inputs computed for the custom action from the real-time robotic control system, all while maintaining the tight timing constraints of the real-time robot control system, i.e., within certain periodic time windows.

Particular embodiments of the subject matter described in this specification can be implemented so as to realize one or more of the following advantages.

The real-time robotics control framework, as disclosed in this specification, is equipped with a buffering mechanism that extends its real-time control capability to additionally support a wider range of complex robotic task while achieving higher precision movements and shorter cycle times. By offering a buffer for storing the data elements in a streamed sequence of control data, the real-time robotic control framework allows for prompt execution of a custom real-time action so long as the buffer is (at least partially) filled, rather than having to wait for the computation of the entire sequence of control data to finish. The framework also allows for easier incorporation of non-real-time trajectory generators, non-real-time observations, or both into custom real-time control, thereby extending its real-time control capability to support vastly more advanced robotic control including, for example, impedance controlled trajectory tracking, online trajectory tracking (where execution starts before the entire trajectory is computed), visual servoing (also known as vision-based robot control, a technique which uses feedback information extracted from a vision sensor to control the motion of a robot), and other sensor-guided motion.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
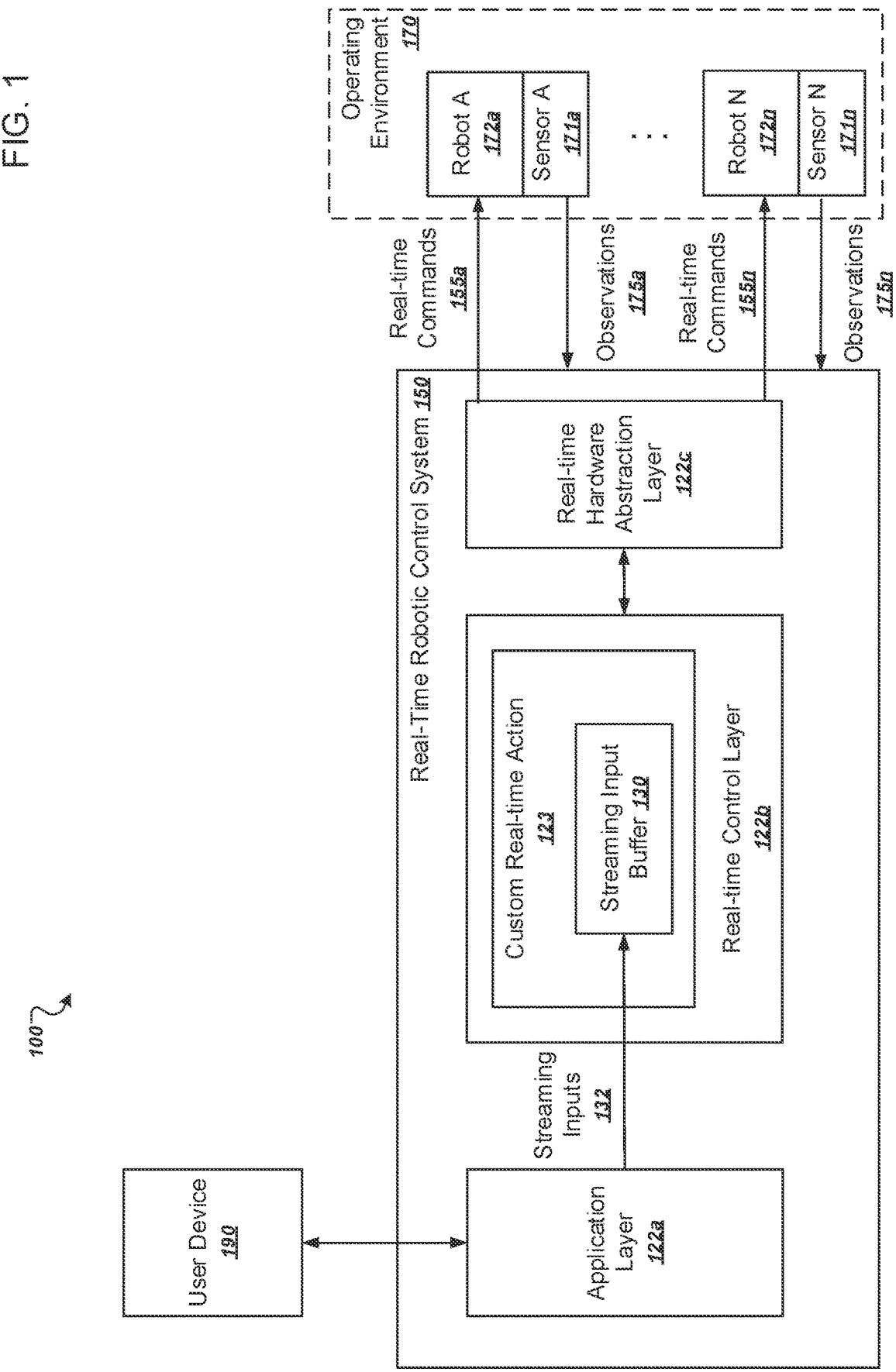
FIG. 1 is a diagram of an example system.

FIG. 1 is a diagram of an example system 100. The system 100 includes a real-time robotic control system 150 to drive multiple robots 172*a-n* in an operating environment 170. The system 100 includes a number of functional components that can each be implemented as computer programs installed on one or more computers in one or more locations that are coupled to each other through any appropriate communications network, e.g., an intranet or the Internet, or combination of networks.

The system 100 is an example of a system that can implement the real-time robotics control framework as described in this specification. In particular, the system 100 can provide a unified framework that allows users to achieve multiple different types of custom real-time control. In this specification, a robotic control system being described as being real-time means that it is required to execute within strict timing requirements to achieve normal operation. The timing requirements specify that certain actions must be executed or outputs must be generated within a particular time window in order for the system to avoid entering a fault state. For brevity, each time window may be referred to as a tick or a control tick. In the fault state, after a tick has elapsed without completing its required computations or actions, the system can halt execution or take some other action that interrupts normal operation, e.g., returning the robots to a starting pose or a fault pose.

Operations, e.g., processing steps for completing a task or function, in a non-real-time system are known as non-deterministic operations, which are not required to complete within a given tick to be successful. In contrast, a real-time system requires deterministic operations, which are required to occur every tick. In non-real-time and real-time systems, a scheduler may be utilized to determine the amount of resources, e.g., network bandwidth, memory, processor cycles, or a combination thereof, that an action is allotted for execution. If no or inadequate resources are allocated, the real-time system can also enter the fault state. The real-time operations are generally implemented by software module loops. Each software module loop includes multiple software modules executed in a predetermined sequence repeatedly.

To control the robots 172a-n in the operating environment 170, the real-time robotic control system 150 provides commands, e.g., real-time control commands 155a-n, to be executed by one or more robots, e.g., robots 172a-n, in the operating environment 170. In order to compute the commands, the real-time robotic control system 150 consumes observations 175a-n made by one or more sensors 171a-n gathering data within the operating environment 170. As illustrated in FIG. 1, each sensor 171 is coupled to a respective robot 172. However, the sensors need not have a one-to-one correspondence with robots and need not be coupled to the robots. In fact, each robot can have multiple sensors, and the sensors can be mounted on stationary or movable surfaces in the operating environment 170. Any suitable sensors 171 can be used, such as distance sensors, force sensors, torque sensors, cameras, to name just a few examples.

Generally, the real-time robotic control system 150 can provide commands through a control stack that handles providing real-time control commands 155a-n to the robots 172a-n. The control stack 122 can be implemented as a software stack that is at least partially hardware-agnostic. In other words, in some implementations the software stack can accept, as input, commands generated by the control system 150 without requiring the commands to relate specifically to a particular model of robot or to a particular robotic component.

The control stack 122 includes multiple levels, with each level having one or more corresponding software modules. In FIG. 1, the lowest level is the real-time hardware abstraction layer 122c which executes within strict real-time requirements, e.g., by providing a command at a first, fixed rate, e.g., every 1, 5, 10, or 20 milliseconds, and the highest level is the application layer 122a which executes within non-real-time requirements, e.g., by providing a command at second, lower rate, which may sometimes be a varying rate or a rate that is sporadic, or both. Interposed between the non-real-time application layer 122a and the real-time hardware abstraction layer 122c is a control layer 122b, which handles bridging the boundary between the non-real-time commands generated by upper-level software modules in the control stack 122 and the real-time commands generated by the lower-level software modules in the control stack 122. More details of the control stack 122 are described in commonly owned U.S. patent application Ser. No. 17/246, 082, which is herein incorporated by reference.

The control layer 122b serves as a bridging module in the control stack that translates each non-real-time command into data that can be consumed by real-time controllers that are responsible for generating low-level real-time commands. Such low-level real-time commands can, for example, relate to the actual levels of electrical current to be applied to robot motors and actuators at each point in time in order to effectuate the movements specified by the command.

The control layer 122b implements real-time software modules that facilitate various types of custom real-time control, including custom real-time action and custom real-time reaction. In this specification, an action refers to a motion having precomputed motion parameters, such as moving a tool on a robot arm from point A to point B. A reaction refers to a real-time switch between actions due to certain specified conditions, which can include sensor data that is updated in real-time.

A user of the system 100 can initiate the execution of custom real-time control by providing custom real-time control information to the real-time robotic control system 150. For example, a user can use a user device 190 to provide custom real-time control information to the application layer 122a. For example, through an integrated development environment (IDE) executed in the user device 190, the user can write code that defines the control logic for the one or more robots to perform a custom real-time action 123.

A powerful feature of the framework described in this specification is the integration of streaming inputs 132 into the mechanisms of custom real-time control. In other words, the framework facilitates custom, real-time handling of streaming inputs 132. Streaming inputs are inputs that may arrive at varying rates or non-deterministically, e.g., with incomplete information, or both. Oftentimes, the application layer 122a executing the user-defined control logic may generate and provide to the control layer 122b a sequence control data (or information) in the format of streaming inputs which do not meet the tight timing constraints of the real-time robot control system 150.

For example, a trajectory generator running at the application layer 122a configured to generate one or more target trajectories for the robots 172a-n may generate and provide streaming trajectory information to the control layer 122b. The trajectory information includes at least a trajectory set point (or goal state) for a robot component, e.g., a robot joint, and optionally other metadata. A set point can include for each moment in a particular time period, one or more of a position, a velocity, or an acceleration for the robot component.

In this example, if the trajectory generator is configured to compute an optimized, e.g., smooth or fast, trajectory for the robot joint by way of performing costly optimization to optimize an objective function in non-real-time, the trajectory generator may then compute the trajectory set points in varying rates, because a solution may not be determined during every fixed computation time window. Moreover, if the trajectory generator is configured to compute some other complex trajectories based on status messages generated by other software modules in the control stack 122, the observations 175, or both, the trajectory generator may also compute the trajectory set points in varying rates. One example of such complex trajectory is an adaptive trajectory for dispensing glue on a deformable object, i.e., in contrast to a nominal glue trajectory for a rigid (non-deformable) object.

As another example, the application layer 122a, when executing some computationally expensive control functionality such as a machine-learned control algorithm, may generate and provide streaming control commands to the control layer 122b. For example, the application layer 122a can implement a perception machine learning model that is configured to compute, as the sequences of control data, visual picking commands based on processing non-real-time observations obtained from a camera sensor that observes a moving object, for example an object on a conveyor belt.

To handle the streaming inputs, the real-time robotic control system 150 includes a real-time streaming input buffer 130 for storing a number of data elements in the sequence control data streamed from the application layer 122a. The control layer 122b can then read the data elements from the buffer and perform real-time operations based on the read data elements. In particular, the control layer 122b will read at least the next buffered data element, or optionally a number of buffered data elements, at every tick of a real-time control loop, and correspondingly compute a robot control signal from the read data elements of the sequence of control data at every tick of the real-time control loop, despite the application layer 122a may provide the data elements at a varying rate or a rate that is sporadic.

More specifically, after reading one or more data elements for a custom real-time action, e.g., the custom real-time action 123, from the buffer, the software modules included in the control layer 122b can process the read data elements to produce continuous real-time control signals including, e.g., real-time positions, velocities, or torques for a robot component such as a robot joint, which determine how to drive the motors and actuators of the robots 172a-n in order to effectuate the custom real-time action. The continuous real-time control signals can then be consumed by the hardware abstraction layer 122c. The hardware abstraction layer 122c can include a software module, e.g., a real-time controller module, that interfaces the robot 172a-n, e.g., by issuing real-time commands 155a-n to drive the movements of the moveable components such as joints of the robots 172a-n in the operating environment 170 to execute the custom real-time action.

This buffering capability offered by the real-time streaming input buffer 130 thus accommodates two different computing zones, i.e., a first computing zone corresponding to the non-real-time application layer 122a where a data element in a sequence control data is not guaranteed to be computed at every tick of the real-time control loop, and a second computing zone corresponding to the real-time control layer 122b where a real-time control signal is guaranteed to be computed at every tick. This capability for providing custom, real-time handling of streaming inputs 132 is more powerful than existing techniques that use predefined data interpolation or extrapolation logic to generate one interpolated or extrapolated control parameter at each tick, e.g., from a defined range of possible values that the robot can assume, where precise following of a trajectory is unfeasible since very limited interpolation capability is provided by such techniques. For example, the described buffering capability allows for the real-time robotic control system 150 to execute a custom real-time action for a robot component to follow an online trajectory, e.g., an online Cartesian trajectory, with high precision and as long as streaming input buffer is filled with enough data elements that can be used by the control layer 122b to compute a control signal at a next tick for the custom real-time action that is currently in execution. Here "online" means that execution starts before the entire trajectory is computed.

Figure 2:
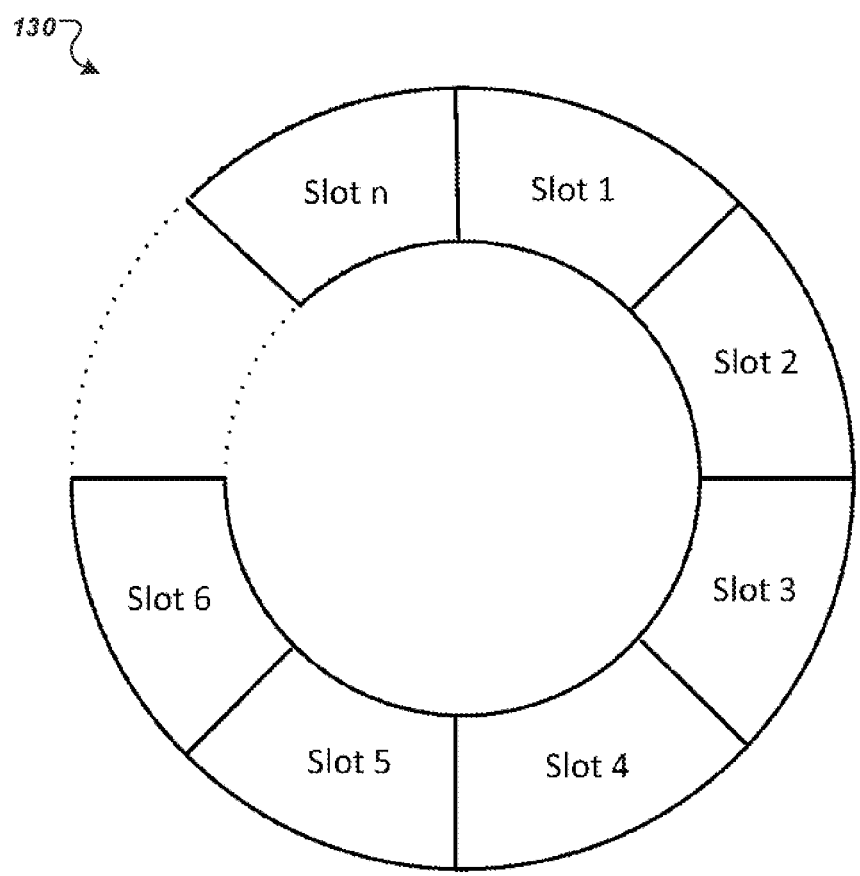
FIG. 2 is an example illustration of a real-time streaming input buffer.

FIG. 2 is an example illustration of the real-time streaming input buffer 130. In the example of FIG. 2, the streaming input buffer 130 is a ring buffer, although other types of buffers may also be used; generally, a FIFO (First In First Out)-type buffer is preferred. A ring buffer is a data structure with a fixed number of slots of a predetermined size for storing data elements. Ring buffers have read and write pointers that wrap around to the beginning of the ring buffer after reaching an end point of the ring buffer, giving the ring buffer its "circular" perception despite it being a linear data structure. Each trip around the ring buffer may result in older data elements stored in the ring buffer's slots being overwritten with newer data elements.

FIG. 2 illustrates the real-time streaming input buffer 130 as including N slots, where N is a fixed number. Each slot corresponds a predefined area in a memory for storing a data element (or a pointer to the data element) in a sequence of control data. Each predefined area may have a fixed size. The fixed number of slots, the fixed size of predefined area, or both may be determined and allocated based on a maximum possible size of a sequence of control data that can be computed by the application layer 122a.

The streaming input buffer 130 can be positioned in any suitable location within the system 100. In the example shown in FIG. 1, the streaming input buffer 130 is implemented in a memory accessible to or shared with the control layer 122b. But in other examples, the streaming input buffer 130 may be separate from, and serve as an intermediary between, the application layer 122a and the streaming input buffer 130. A location of the streaming input buffer 130 is suitable so long as the application layer 122a can write data elements to the buffer and the control layer 122b can read data elements from the streaming input buffer 130.

In some implementations, the application layer 122a can write the data elements in the sequence of control data to the streaming input buffer 130 by directly writing the data elements as flat data objects to the buffer. Flat data objects are data objects that have a static length and do not refer to other objects. Most elementary data objects, including Boolean, integers, floating point numbers, and so on, are examples of flat data objects. In these implementations, slot 1 can correspond to a first predefined area for storing a first data element in the sequence of control data. Slot 2 can correspond to a second predefined area for storing a second data element in the sequence of control data. Slot 3 can correspond to a third predefined area for storing a third data element in the sequence of control data. And so on.

In other implementations, the application layer 122a can alternatively write the data elements to the streaming input buffer 130 by using indirection to facilitate the passing of data elements with varying sizes, even including arbitrarily large data elements, from the application layer 122a to the control layer 122b. That is, instead of writing the data elements themselves into the buffer, the application layer 122a writes pointers to the data elements and, optionally, associated metadata into the buffer which can then be used by the control layer 122b to access the data elements. For example, these pointers may point at different locations within another data structure, which is implemented in the same or different memory than the streaming input buffer 130, that actually stores the data elements computed by the application layer 122a. The metadata may include data that defines the size of each data element. The metadata may also include a format description of how the data element is to be interpreted. In the example where each data element is a joint position vector, the metadata may include the size of the vector, the type of each floating-point value, and a number of padding bytes. In these other implementations, slot 1 can correspond to a first predefined area for storing a first pointer to (and optionally, the metadata of) a first data element in the sequence of control data. Slot 2 can correspond to a second predefined area for storing a second pointer to a second data element in the sequence of control data. Slot 3 can correspond to a third predefined area for storing a third pointer to a third data element in the sequence of control data. And so on.

Any of a variety of data elements can be stored (either direct or indirect, as mentioned above) in the streaming input buffer 130. For example, the sequence of control data can represent trajectory information for a robot component, where each data element in the sequence can correspond to a respective set point along a target trajectory for the robot component. A set point can include for each moment in a particular time period, one or more of a position, a velocity, or an acceleration for the robot component. A set point can be defined in Cartesian-space or joint-space coordinates. As another example, the data elements can include spline parameters that define a spline function, such as a Hermite spline function, a B-spline function, or the like, that uses piecewise polynomials to approximate the target trajectory for the robot component. As yet another example, the data elements can include parameters for various types of compliant control, including admittance control and impedance control, of the robot component, e.g., when interacting with and object in the operating environment.

Figure 3:
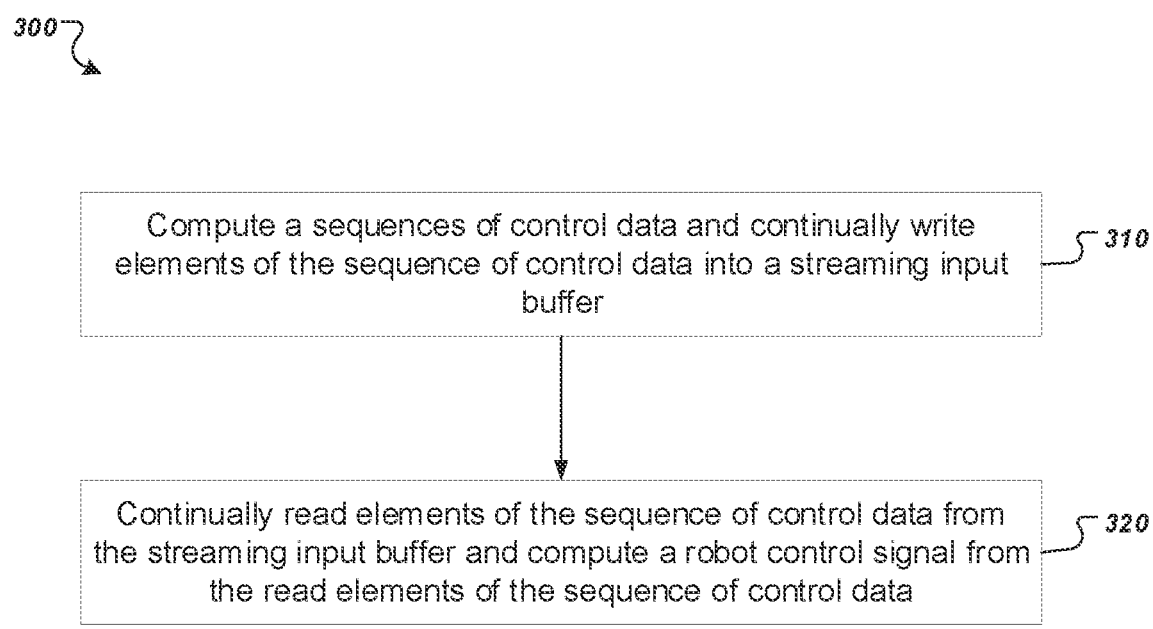
FIG. 3 is a flowchart of an example process for writing into and reading from a real-time streaming input buffer.

FIG. 3 is a flowchart of an example process 300 for writing into and reading from a real-time streaming input buffer. The process 300 can be implemented by one or more computer programs installed on one or more computers and programmed in accordance with this specification. For example, the process 300 can be performed by the real-time robotic control system 150 shown in FIG. 1. For convenience, the process 300 will be described as being performed by a system of one or more computers.

The system computes a sequence of control data and continually writes data elements of the sequence of control data into a real-time streaming input buffer (310). The computation process can be performed by a non-real-time control layer of the system. For example, the non-real-time control layer can be the application layer in the real-time robotic control system, where the application layer implements a software module that computes each data element of the sequence of control data in accordance with user-defined control logic, and writes that data element to a corresponding slot of the streaming input buffer. Put another way, the data elements of the sequence of control data are buffered in the streaming input buffer as the data element are computed by the non-real-time control layer.

The system continually reads elements of the sequence of control data from the real-time streaming input buffer and computes a robot control signal from the read elements of the sequence of control data at every tick of a real-time control loop (320). The read process can be performed by a real-time control layer of the system. The computation of the robot control signal can include performing calculations on multiple data elements. For example, the real-time control layer can be the control layer in the real-time robotic control system, where the control layer implements a software module that accesses one or more data elements stored in the buffer, and computes a robot control signal from the accessed data elements of the sequence of control data at every tick of a real-time control loop.

A detailed example of writing into and reading from the real-time streaming input buffer that is configured as a ring buffer will now be described. To write into/read from the ring buffer, the non-real-time control layer can maintain a write pointer indicating (an address of) the next slot to be written to in the ring buffer, while the real-time control layer can maintain a read pointer indicating the next slot to be read from the ring buffer. When the non-real-time control layer writes a new data element to the ring buffer, the non-real-time control layer can update the write pointer. Similarly, when the real-time control layer reads a new data element from the ring buffer, real-time control layer can update the read pointer in real-time control layer. Other synchronization mechanisms are possible. When the read and/or write pointers reach the last (e.g., the highest) slot allocated for the ring buffer, the read and/or write pointers can wrap around to the first (e.g., the lowest) slot to implement a circular memory scheme.

In some implementations, the non-real-time control layer can directly write the data elements in the sequence of control data to the ring buffer, while in other implementations, the non-real-time control layer can write the data elements to the ring buffer by using indirection, i.e., by storing pointers to the data elements and, optionally, associated metadata into the ring buffer. The write process may not happen at every tick of the real-time control loop. Moreover, the write process may take more or less time depending on the size of the data elements, and thus may not finish within the same tick that it was initiated.

As the non-real-time control layer writes to the ring buffer, the real-time control layer can read from the ring buffer. In particular, the real-time control layer can read a data element from each of one or more slots of the ring buffer, and use the read data elements to compute a robot control signal for controlling a robot to execute a custom real-time action at every tick of the real-time control loop.

In some implementations, the real-time control layer can read one data element, e.g., the oldest data element, from the buffer at every tick and use that to compute the robot control signal for the tick, while in other implementations, the real-time control layer can instead read a sliding window of multiple data elements at every tick. Reading multiple elements allows for easier interpolation of set points to follow complex trajectories.

In some implementations, reading from the buffer also involves querying the buffer size, and the real-time control layer can additionally or alternatively compute a robot control signal for controlling the robot to execute a fallback action when the number of the buffered data elements runs low, i.e., when below a threshold number (or percentage) of the plurality of slots of streaming input buffer are filled. For example, the fallback action can be a deceleration action which lowers the speed of execution of the custom real-time action by a robot, or another recovery action which causes the robot to return to a maintenance position. Likewise, the real-time control layer can compute a robot control signal for controlling the robot to execute an acceleration action when above a threshold number (or percentage) of the plurality of slots of streaming input buffer are filled.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the real-time robotic control system 150 of FIG. 1.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an operating environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a system comprising a plurality of computers and one or more storage devices storing instructions that when executed by the plurality of computers implement a robotic control system comprising:
a non-real-time control layer configured to compute a sequence of control data and to continually write data elements of the sequence of control data into a real-time streaming input buffer; and
a real-time control layer configured to continually read data elements of the sequence of control data from the real-time streaming input buffer and to compute a robot control signal from the read data elements of the sequence of control data at every tick of a real-time control loop.

Embodiment 2 is the system of embodiment 1, wherein the real-time streaming input buffer is located in a memory accessible to or shared with the non-real-time control layer and the real-time control layer.

Embodiment 3 is the system of any one of embodiments 1-2, wherein the real-time streaming input buffer is a ring buffer.

Embodiment 4 is the system of any one of embodiments 1-3, wherein each slot of a plurality of slots in the real-time streaming input buffer stores a corresponding data element of the sequence of control data.

Embodiment 5 is the system of any one of embodiments 1-3, wherein each slot of a plurality of slots in the real-time streaming input buffer stores a pointer to a corresponding data element of the sequence of control data.

Embodiment 6 is the system of any one of embodiments 1-5, wherein the non-real-time control layer is an application layer of a real-time robotics control framework that implements a software module that computes the sequences of control data in accordance with user-defined control logic.

Embodiment 7 is the system of embodiment 6, wherein the software module that computes the sequences of control data comprises a non-real-time trajectory generator that is configured to compute a sequence of set points or spline parameters along a user-defined trajectory.

Embodiment 8 is the system of any one of embodiments 1-7, wherein the real-time control layer is configured to compute a robot control signal for controlling a robot to execute a custom real-time action at every tick of the real-time control loop.

Embodiment 9 is the system of embodiment 8, wherein controlling the robot to execute the custom real-time action comprises computing the robot control signal based on non-real-time sensor measurements.

Embodiment 10 is the system of any one of embodiments 4-5, wherein the real-time control layer is configured to compute a robot control signal for controlling the robot to execute a fallback action when below a threshold number of the plurality of slots of streaming input buffer are filled.

Embodiment 11 is the system of embodiment 10, wherein the fallback action comprises a deceleration action.

Embodiment 12 is a method comprising the operations that the auto-scalable synthetic data generation system of any one of claims 1-11 is configured to perform.

Embodiment 13 is a computer storage medium encoded with a computer program, the program comprising instructions that are operable, when executed by data processing apparatus, to cause the data processing apparatus to perform the operations that the auto-scalable synthetic data generation system of any one of claims 1-11 is configured to perform.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising a plurality of computers and one or more storage devices storing instructions that when executed by the plurality of computers implement a robotic control system comprising:
   a non-real-time control layer that implements one or more software modules that comprise a non-real-time trajectory generator configured to compute a sequence of control data that comprises set points that are generated by the non-real-time trajectory generator based on a user-defined trajectory and that define goal states for one or more robot joints of the robot when controlling the robot to move along the user-defined trajectory, and to continually write the set points in the sequence of control data into a real-time streaming input buffer at a varying or non-deterministic rate; and
   a real-time control layer configured to continually read the set points in the sequence of control data from the real-time streaming input buffer and to compute a robot control signal from the set points in the sequence of control data at every tick of a real-time control loop.

2. The system of claim 1, wherein the real-time streaming input buffer is located in a memory accessible to or shared with the non-real-time control layer and the real-time control layer.

3. The system of claim 1, wherein the real-time streaming input buffer is a ring buffer.

4. The system of claim 1, wherein each slot of a plurality of slots in the real-time streaming input buffer stores a corresponding data element of the sequence of control data.

5. The system of claim 1, wherein each slot of a plurality of slots in the real-time streaming input buffer stores a pointer to a corresponding data element of the sequence of control data.

6. The system of claim 1, wherein the non-real-time control layer is an application layer of a real-time robotics control framework that implements a software module that computes the sequences of control data in accordance with user-defined control logic.

7. The system of claim 1, wherein the real-time control layer is configured to compute a robot control signal for controlling a robot to execute a custom real-time action at every tick of the real-time control loop.

8. The system of claim 7, wherein controlling the robot to execute the custom real-time action comprises computing the robot control signal based on non-real-time sensor measurements.

9. The system of claim 4, wherein the real-time control layer is configured to compute a robot control signal for controlling the robot to execute a fallback action when below a threshold number of the plurality of slots of streaming input buffer are filled.

10. The system of claim 9, wherein the fallback action comprises a deceleration action.

11. A method comprising:
   computing, at a non-real-time control layer that implements one or more software modules that comprise a non-real-time trajectory generator, a sequence of control data that comprises set points that are generated by the non-real-time trajectory generator based on a user-defined trajectory and that define goal states for one or more robot joints of the robot when controlling the robot to move along the user-defined trajectory, and continually writing the set points in the sequence of control data into a real-time streaming input buffer at a varying or non-deterministic rate; and
   continually reading the set points in the sequence of control data from the real-time streaming input buffer and computing, at a real-time control layer, a robot control signal from the set points in the sequence of control data at every tick of a real-time control loop.

12. The method of claim 11, wherein the real-time streaming input buffer is located in a memory accessible to or shared with the non-real-time control layer and the real-time control layer.

13. The method of claim 11, wherein the real-time streaming input buffer is a ring buffer.

14. The method of claim 11, wherein each slot of a plurality of slots in the real-time streaming input buffer stores a corresponding data element of the sequence of control data.

15. The method of claim 11, wherein each slot of a plurality of slots in the real-time streaming input buffer stores a pointer to a corresponding data element of the sequence of control data.

16. The method of claim 11, wherein the non-real-time control layer is an application layer of a real-time robotics control framework that implements a software module that computes the sequences of control data in accordance with user-defined control logic.

17. The method of claim 11, wherein the real-time control layer is configured to compute a robot control signal for controlling a robot to execute a custom real-time action at every tick of the real-time control loop.

18. A non-transitory computer storage medium encoded with a computer program, the program comprising instructions that are operable, when executed by data processing apparatus, to cause the data processing apparatus to implement a robotic control system comprising:
   a non-real-time control layer that implements one or more software modules that comprise a non-real-time trajectory generator configured to compute a sequence of control data that comprises set points that are generated by the non-real-time trajectory generator based on a user-defined trajectory and that define goal states for one or more robot joints of the robot when controlling the robot to move along the user-defined trajectory, and to continually write the set points in the sequence of control data into a real-time streaming input buffer at a varying or non-deterministic rate; and
   a real-time control layer configured to continually read the set points in the sequence of control data from the real-time streaming input buffer and to compute a robot control signal from the set points in the sequence of control data at every tick of a real-time control loop.

19. The system of claim 1, wherein for each of the one or more robot joints of the robot, the set points define one or both of: a velocity of the robot joint at a particular time period, or an acceleration of the robot joint at the particular time period.

20. The method of claim 11, wherein for each of the one or more robot joints of the robot, the set points define one or both of: a velocity of the robot joint at a particular time period, or an acceleration of the robot joint at the particular time period.

* * * * *